United States Patent [19]

Matsumura et al.

[11] 4,316,173

[45] Feb. 16, 1982

[54] DOPPLER RADAR VEHICLE SPEED SENSING SYSTEM INCLUDING MEANS FOR CHECKING SYSTEM OPERATION BASED ON THE DETECTION OF LOW FREQUENCY DOPPLER FREQUENCY COMPONENTS

[75] Inventors: Akira Matsumura, Yokosuka; Akira Endo, Katsuta; Kenji Sekine, Tokyo, all of Japan

[73] Assignees: Hitachi, Ltd; Nissan Motor Co., Ltd., both of Tokyo, Japan

[21] Appl. No.: 156,814

[22] Filed: Jun. 5, 1980

[30] Foreign Application Priority Data

Jun. 15, 1979 [JP] Japan .................................. 54-74725

[51] Int. Cl.³ .......................... G08G 29/00; G01S 7/40
[52] U.S. Cl. ........................................ 340/32; 340/53; 340/554; 343/7 VM; 343/17.7
[58] Field of Search ..................................... 340/32–34, 340/53, 62, 554; 343/17.7, 7 VM; 180/169; 367/94, 107, 112, 91

[56] References Cited

U.S. PATENT DOCUMENTS

| | | | |
|---|---|---|---|
| 3,745,572 | 7/1973 | Sato et al. | 343/7 VM |
| 3,789,950 | 2/1974 | Strenglein | 340/33 |
| 4,180,816 | 12/1979 | Endo et al. | 343/7 VM |
| 4,225,950 | 9/1980 | Kotera et al. | 343/7 VM |

FOREIGN PATENT DOCUMENTS 2734998 2/1978 Fed. Rep. of Germany ... 343/7 VM
1402408 8/1975 United Kingdom .

*Primary Examiner*—James J. Groody
*Attorney, Agent, or Firm*—Craig and Antonelli

[57] ABSTRACT

A vehicle speed sensing apparatus with means for checking its operation comprises a Doppler radar unit for producing a Doppler signal related to a vehicle speed and producing a speed signal from the Doppler signal, a first section for extracting low frequency components in the Doppler signal and a second section connected with the first section for producing an operation check signal. The extracted low frequency components correspond to vertical motion of the vehicle and are considerably lower than a Doppler signal frequency which corresponds to a minimum vehicle speed. If these low frequency components corresponding to vertical motion are not present, it is an indication that the speed sensing system is not operating properly.

4 Claims, 9 Drawing Figures

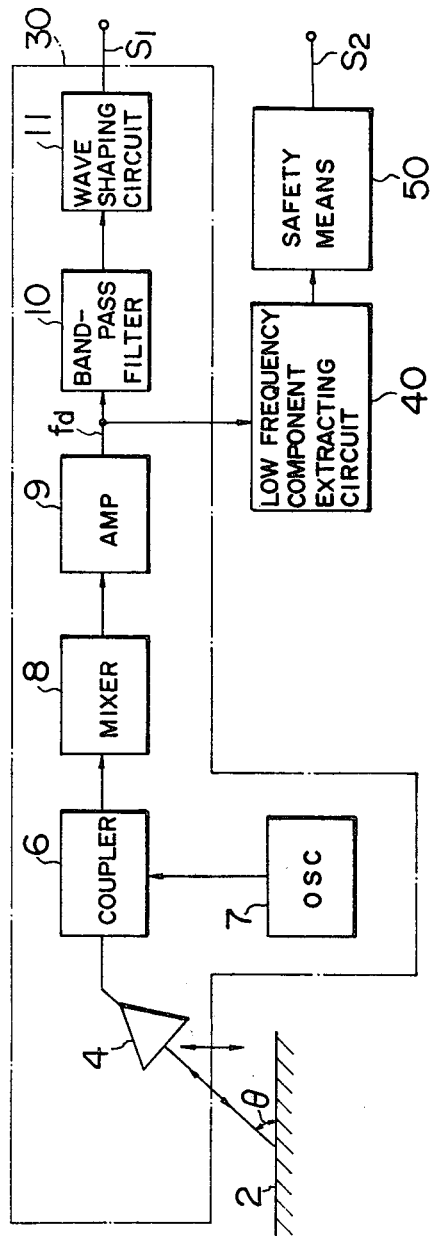
F I G. 3
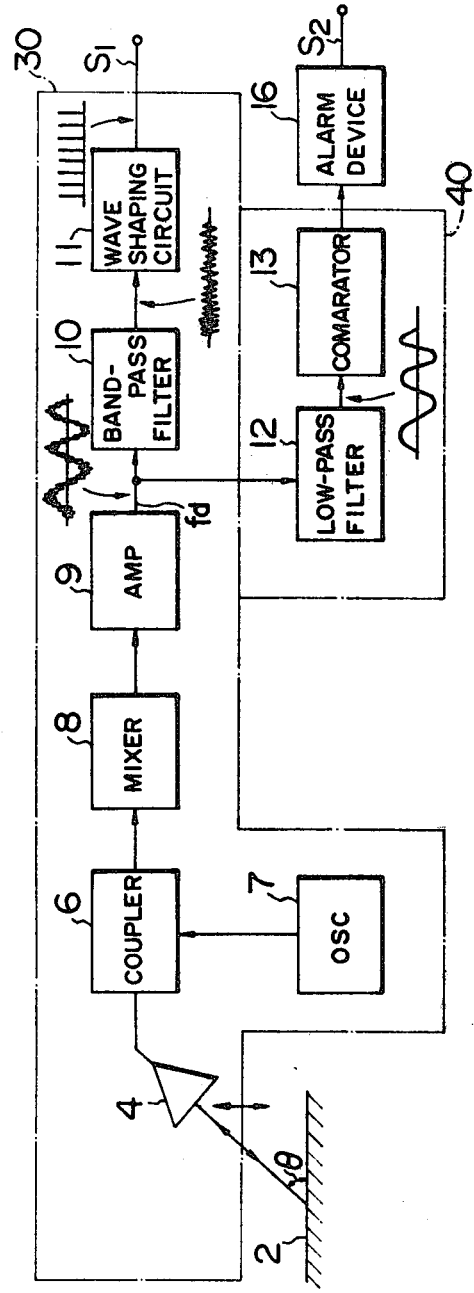
F I G. 4

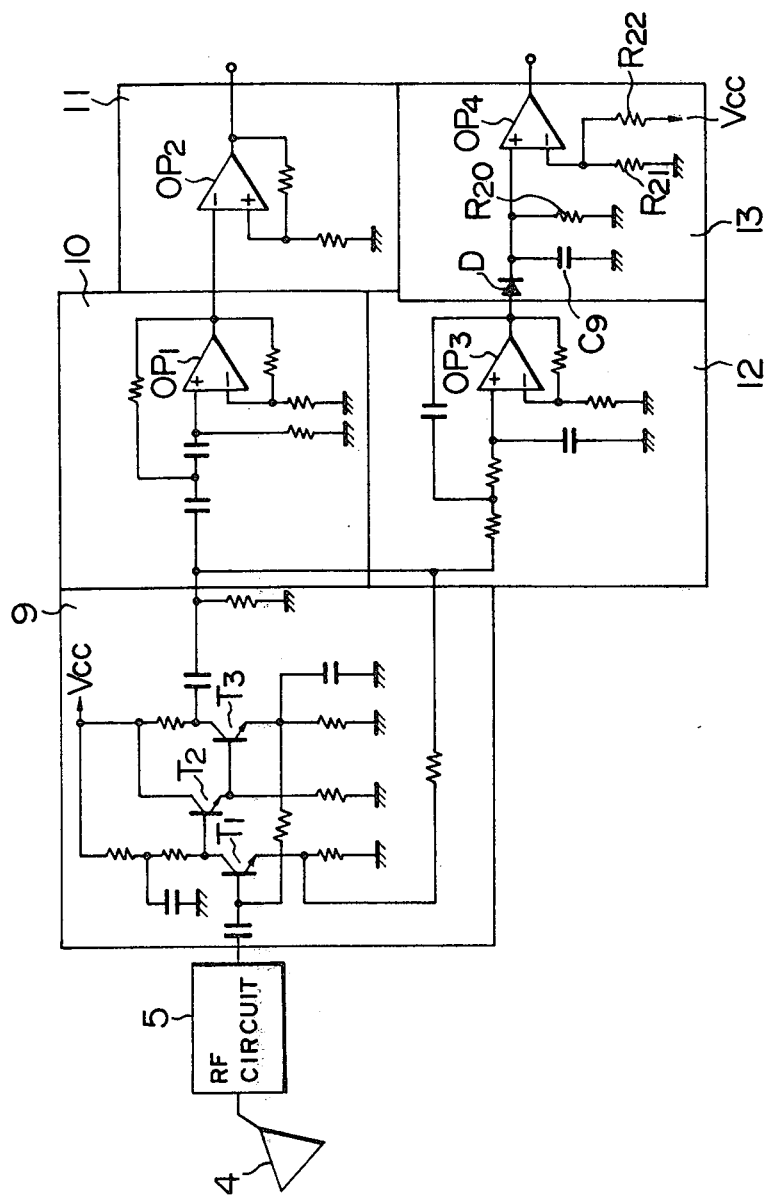
F I G. 5

DOPPLER RADAR VEHICLE SPEED SENSING SYSTEM INCLUDING MEANS FOR CHECKING SYSTEM OPERATION BASED ON THE DETECTION OF LOW FREQUENCY DOPPLER FREQUENCY COMPONENTS

This invention relates to an apparatus mounted on a vehicle such as automobiles for sensing the vehicle speed thereof with respect to a vehicle travelling surface (hereafter referred to as vehicle speed), in particular to one provided with safety check-up devices.

According to the invention there is provided a vehicle speed sensing apparatus with means for checking its operation, comprising:

a Doppler radar unit on a vehicle for directing RF energy to a surface over which a vehicle travels and receiving reflected RF energy from the surface to produce a Doppler signal related to the speed of the vehicle, the unit including a circuit for producing a speed signal from the Doppler signal;

means connected with the radar unit for extracting from the Doppler signal low frequency components the frequencies of which are lower than the frequency of such a Doppler signal as corresponding to a minimum vehicle speed, the low frequency components being representative of vehicle motion in a direction substantially vertical to the vehicle travel surface; and safety means connected with the extracting means for producing an operation check signal.

Vehicle speed sensing apparatuses according to this invention can be effectively used in such apparatuses requiring vehicle speed information as skid control apparatus, electronic control devices for transmission mechanisms and overspeed alarm apparatuses, as well as for speedometers, for driver viewing.

According to a principal aspect of the invention, the operation of a vehicle speed sensing apparatus of the type having a Doppler radar unit is checked through detection of low frequency components contained in the output of the Doppler radar unit and distinct from the Doppler signal representative of the vehicle speed. This is based on the inventors' finding through experiments that the vehicle speed sensing apparatus mounted on a vehicle, when operating normally, provides a Doppler radar unit output containing the above-mentioned low frequency components at about 10 Hz stemming from vertical motion of the vehicle (substantially perpendicular to the road surface) when the vehicle is in an idling operation or is running. Thus, it is possible with the vehicle speed sensing apparatus to check the operation of the apparatus while the vehicle engine is idling or the vehicle is running.

The invention will now be described by way of example only with reference to the accompanying drawings, in which:

FIG. 3 is a block diagram of an embodiment of the invention;

FIG. 4 is a block diagram of another embodiment of the invention;

FIG. 5 illustrates a circuit construction of the embodiment of FIG. 4;

A vehicle speed sensing apparatus of the type having a Doppler radar unit senses the speed of a vehicle by transmitting waves from its radar antenna on the vehicle to a road surface and receiving Doppler shifted waves reflected from the road surface back to the same antenna. The operation of such a vehicle speed sensing apparatus may be checked by testing Doppler signals obtained during driving. However, it is often required that the operation of the apparatus be checked prior to driving of a car from the viewpoint of safety when it is used, for example, as a vehicle speed sensor for a skid control system.

There have been known conventional apparatuses designed to meet such a requirement, having such a structure that a first stage amplifier is biased by the current produced by a mixer diode in a mixer section for mixing a portion of transmitted waves with reflected waves to provide a Doppler signal in which, when a radio frequency circuit including the transmission section and the mixer section thereof is subjected to some trouble, the amplifier section thereof will not operate. See, for example, British Pat. No. 1,402,408 (issued on Aug. 6, 1975 to Nissan Motor Company, Limited).

In another aspect of the invention, the vehicle speed sensing apparatus of the invention is capable of detecting a drop in performance of the radar system in the apparatus due to, for example, mud filling the antenna which makes detection of reflected waves impossible or makes the oscillation frequency of the transmitted waves deviate, thereby lowering the sensitivity of reception of the reflected waves.

Figure 1:
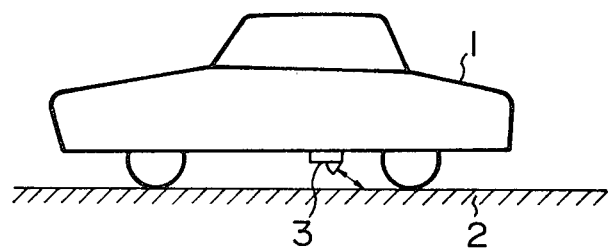
FIG. 1 illustrates an example of location of a vehicle speed sensing apparatus of the type having a Doppler radar unit mounted on a car.
Figure 2:
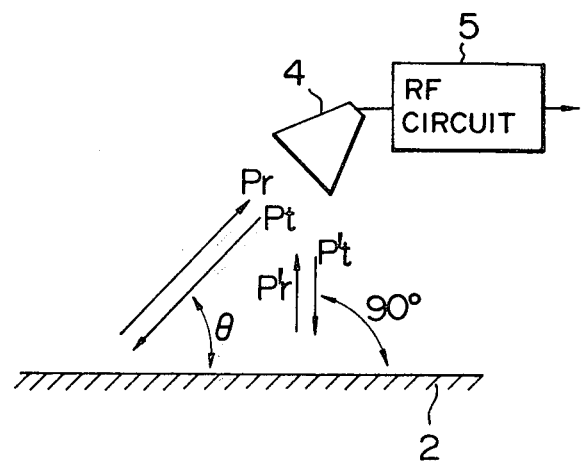
FIG. 2 illustrates directions of propagation of microwave signals transmitted and received by the Doppler radar unit of the apparatus shown in FIG. 1.

FIG. 1 shows a location of a vehicle speed sensing apparatus 3 mounted on a car 1, while FIG. 2 shows the directions of propagation of waves transmitted from and reflected to an antenna 4 of the apparatus. In FIG. 2, microwaves emitted from the antenna 4 of the vehicle speed sensing apparatus on the travelling car 1, at a fixed angle with respect to a road surface 2, are scattered at the road surface 2 and received by the antenna 4 as reflected waves, which are Doppler shifted in frequency due to the relative motion of the car 1 to the road surface 2. The Doppler frequency $f_d$ (Hz) of the reflected wave is given in terms of the vehicle speed V (m/sec), the angle $\theta$, and the wavelength $\lambda$ (m) of the microwaves, as $$f_d = (2V/\lambda) \cos \theta. \tag{1}$$

The angle $\theta$ is usually about 45° for the vehicle speed radar, and therefore the antenna is directed such that the transmission power $P_t$ thereof becomes maximum at this angle $\theta$. In this case there is some emission of power $P_t'$ in the direction $\theta = 90°$, which power is not utilizable in sensing the vehicle speed and is smaller in amount compared to the transmission power $P_t$. According to Eq. (1) the Doppler frequency component $f_d'$ in the travelling or running direction of the vehicle associated with the transmission power $P_t'$ and the reflected power $P_r'$ thereof is zero. On the other hand, since the car is in small vertical oscillatory motion during idling and travelling or driving, the motion being substantially perpendicular to the road surface and in the same direction as the propagation of the above power $P_t'$ at $\theta = 90°$, the waves arising from the transmission power $P_t'$ and the reflected power $P_r'$ get Doppler shifted on account of the vertical motion. Hence, the Doppler signal produced in the vehicle speed sensing apparatus contains those frequency components of the vehicle speed signal associated with the motion of the car substantially perpendicular to the road surface. In FIG. 2 $P_r$ denotes the reflected power stemming from the transmission power $P_t$ given off at the radiation angle $\theta$.

Referring to FIG. 3 an embodiment of the invention will now be described. A vehicle speed sensing apparatus comprises a Doppler radar unit 30, a circuit 40 for extracting low-frequency components, and a safety means 50. A coupler 6, an oscillator 7, and a mixer 8 constitute a radio frequency circuit 5 (FIG. 2). The coupler 6 is provided to an antenna 4 usable for transmission and reception of waves. The mixer 8 receives simultaneously a portion of transmitted waves from the oscillator 7 and reflected waves through the coupler 6, yielding a beat signal resulting from the frequency difference between the two waves. The beat signal is amplified by the amplifier 9 to be delivered therefrom as a Doppler signal. For transmission of a microwave signal having a frequency of 24 GHz emitted at an angle $\theta = 45°$, and the vehicle speed in the range from 10 to 150 Km/h, the frequency in the Doppler signal $f_d$ appearing at the output of the amplifier 9 representative of the vehicle speed ranges from 300 Hz to 4.5 KHz, while the frequency components contained in the Doppler signal due to vertical motions of the car is not higher than 10 Hz.

The Doppler signal $f_d$ is passed through a band-pass filter 10 and a wave shaping circuit 11 for extraction of a component representative of the vehicle speed, i.e., the component is delivered from the output of the wave shaping circuit 11 as signal $S_1$ which is proportional to the vehicle speed. The Doppler signal $f_d$ is further applied to a low-frequency component extracting circuit 40 for the detection of low-frequency components of the Doppler signal arising from the vertical motion of the car. The circuit 40 is so constructed as to generate different output signals depending on the presence or absence of such low-frequency components in the Doppler signals. The safety means 50 operates in response to the output of the circuit 40 to produce an alarm signal $S_2$ whenever the circuit 40 does not detect such low-frequency Doppler signal that are to be present and detected so long as the vehicle speed sensing apparatus is in normal operating conditions.

Referring now to FIGS. 4 and 5, there will be described below another embodiment of the invention. Components similar to those shown in FIG. 3 are denoted by the same reference numerals. The Doppler radar unit 30 is of the same construction as that of FIG. 3. A low-frequency component extraction circuit 40 comprises a low-pass filter 12 and a comparator 13. An alarm device 16 connected with the comparator 13 forms a safety means 50. A portion of the Doppler signal $f_d$ appearing as the output of the amplifier 9 is applied to a low-pass filter 12, the output of which is compared by the comparator 13 with a reference value. Depending upon the result of the comparison, there will be generated different signals. The output of the comparator 13 can drive the alarm device 16 to generate an alarm signal $S_2$. For better understanding, waveforms of the signals appearing at the outputs of the amplifier 9, band-pass filter 10, wave shaping circuit 11 and low-pass filter 12 are indicated.

Referring now to FIG. 5, details of FIG. 4 will be described below.

Figure 6:
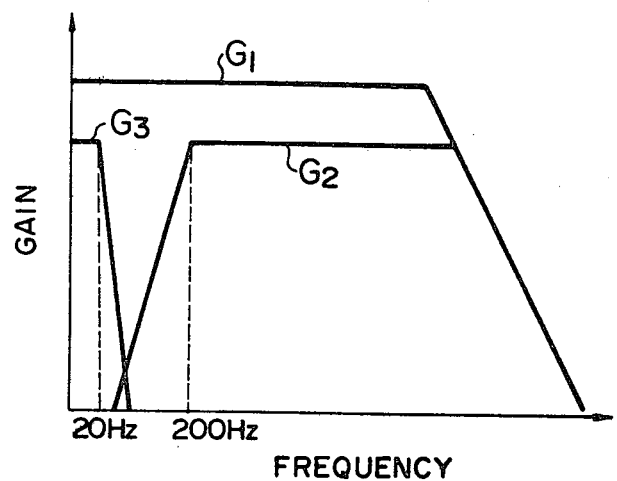
FIG. 6 is a frequency characteristic diagram of some of the amplifiers shown in FIG. 5.

Doppler signals generated by means of the antenna 4 and the radio frequency circuit 5 are fed to a wide band amplifier 9 including transistors T1 through T3 via a capacitor. The Doppler signal thus amplified is delivered both to a band-pass filter 10 including an operational amplifier OP1 and to a low-pass filter 12 including an operational amplifier OP3. The frequency characteristics of the amplifier and the filters are exemplified in FIG. 6 for a case where the frequency of the transmitted signals is 24 GHz and the angle $\theta$ is 45°. In the Figure G1 represents the characteristic curve of the wide band amplifier 9, G2 that of the band-pass filter 10, and G3 that of the low-pass filter 12. The output signal from the band-pass filter 10 is further transmitted to a wave shaping circuit 11 (a hysterisis comparator including an operational amplifier OP2), where the signal is wave-shaped to a rectangular wave signal having the same frequency as the Doppler signal component for use in generation of the vehicle speed signal. The output signal of the low-pass filter 12 is delivered to the comparator 13 which includes a diode D, a capacitor C9, resistors R20, R21 and R22 and an operational amplifier OP4, in which comparator the signal is converted to a DC voltage proportional to the amplitude of a low-frequency Doppler signal for comparison at the operational amplifier OP4 with a reference value set by the resistors R21 and R22. Thus, the vehicle speed sensing apparatus can be checked regarding the characteristics thereof by knowing the output signal of the comparator 13, which signal is utilized to drive the alarm device 16 issuing an alarm such as a buzzer or a lamp.

As is apparent from the above description, a check of the operation of the speed sensing apparatus of the type having a Doppler radar unit is possible merely by adding thereto a simple circuit. Such check can be performed advantageously without relying on any external checking devices.

Figure 7:
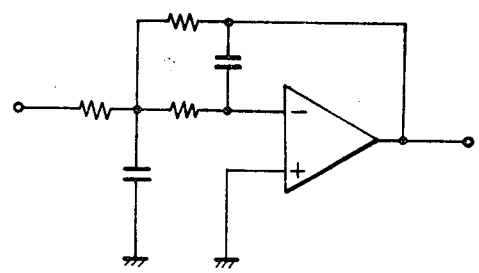
FIGS. 7 and 8 show circuit constructions of low-pass filters used in the invention.
Figure 8:
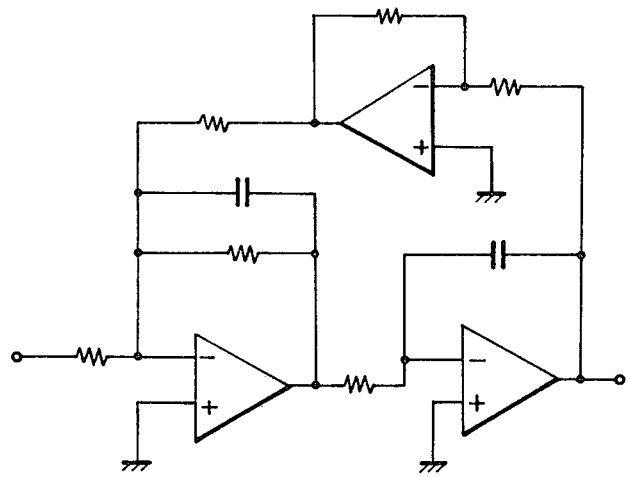

FIGS. 7 and 8 illustrate another construction of the low-pass filter 12 which may be used in the invention. The one shown in FIG. 7 is an infinite-gain multiple feedback low-pass filter and the one in FIG. 8 is a bi-quad low-pass filter. Since the frequency characteristic curve of the filter 12 is required to be steep, these filters, a cascade connection of these filters, a band-pass filter and a digital filter may be alternatively employed.

Figure 9:
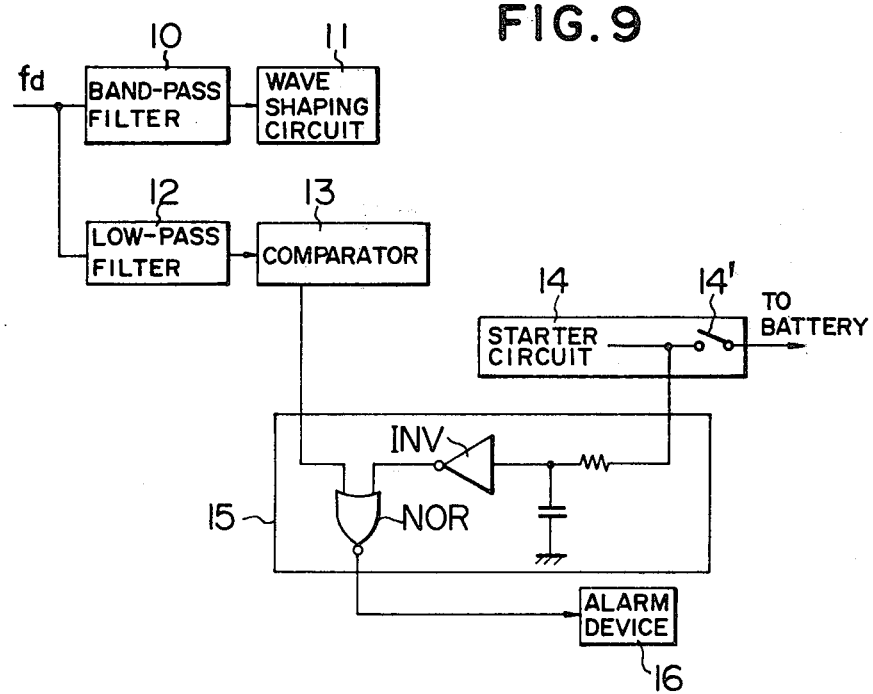
FIG. 9 is a diagram of a further embodiment of the invention.

FIG. 9 illustrates another embodiment of the invention, which is capable of providing operational check of a vehicle speed sensing apparatus mounted on a car during idling of the vehicle engine. The components identical with those described in the above-mentioned embodiments are denoted by the same reference numerals.

A safety means (FIG. 3) includes a discrimination circuit 15 and an alarm device 16. A comparator 13 in a low-frequency component extraction circuit 40 (FIG. 3) is so constructed as to generate a low-level output signal when the output of a low-pass filter 12 is not indicative of the presence of a low-frequency Doppler signal arising from a vertical motion of the car. The discrimination circuit 15 includes a NOR circuit NOR receiving at one input terminal thereof the output of the comparator 13 and an inverter INV operable in response to the action of a starter switch 14' of a starter circuit 14. Namely, the output of the comparator 13 and the output of the inverter circuit INV are applied to the NOR circuit NOR to drive the alarm device 16, the latter output being low only when the starter circuit 14 is set in operation by the starter switch 14'. Thus, malfunction of the Doppler radar caused by adhesion of mud thereto will be indicated by the alarm device with the output of the comparator 13 being then low even when the starter switch 14' is turned on.

More than two vehicle speed sensing apparatus of this invention can be also effectively used on a vehicle.

What we claim is:

1. A vehicle speed sensing apparatus with means for checking its operation, comprising:

a Doppler radar unit on a vehicle for directing RF energy to a surface over which a vehicle travels and receiving reflected RF energy from the surface to produce a Doppler signal related to the speed of the vehicle, the unit including a circuit for producing a speed signal from the Doppler signal;

means connected with the radar unit for extracting from the Doppler signal low frequency components the frequencies of which are lower than such a Doppler signal frequency which corresponds to a minimum vehicle speed, said low frequency components being representative of vehicle motion in a direction substantially vertical to the vehicle travel surface; and safety means connected with said extracting means for producing an operation check signal.

2. An apparatus according to claim 1, in which said extracting means includes a low-pass filter and a comparator connected with the output of said low-pass filter.

3. An apparatus according to claim 1 or 2, in which said safety means includes an alarm device.

4. An apparatus according to claim 1, in which the vehicle has a starter circuit operable at a vehicle start, and said safety means includes a discrimination circuit arranged to receive the output of said extracting means and the output of said starter circuit for generating an output signal depending on the output of said extracting means and an alarm device responsive to the output of said discrimination circuit for delivering an alarm.

* * * * *